UNITED STATES PATENT OFFICE 2,477,672

SYNTHESIS OF NITRILES

Irving D. Webb and Georges E. Tabet, Wilmington, Del., assignors to E. I. du Pont de Nemours & Company, Wilmington, Del., a corporation of Delaware No Drawing. Application May 1, 1947, Serial No. 745,236

19 Claims. (Cl. 260—465.8)

This invention relates to the preparation of organic nitriles and more particularly to improvements in processes for the preparation of organic nitriles containing the structural unit

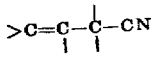

Commercially attractive processes have recently been developed for the manufacture of certain unsaturated organic halides. The unsaturated organic halides which are produced in accordance with the said processes are frequently obtainable in the form of mixed isomers; e. g. the mixed dichlorobutenes which are formed by processes involving halogenation of C₄ hydrocarbons contain two isomers, 1,4-dichloro-2-butene and 3,4-dichloro-1-butene. In the preparation of dinitriles for use as intermediates in the manufacture of nylon-type resins it is highly desirable that a process be provided for converting both of these isomers into the same dinitrile, viz. 1,4-dicyano-2-butene, while at the same time avoiding the cyanation of other organic halides which may be present in the mixture.

In general, all of the previously known methods for converting unsaturated organic halides to nitriles were relatively slow, and generally required a reaction time of several hours. In certain instances, the methods which have been employed heretofore for the conversion of unsaturated halides to nitriles employed alkaline salts such as sodium cyanide, as reactants. These processes generally required the use of organic solvents, either as reaction media or as extractant media for separating the organic salts from the mixture which is formed under alkaline conditions. In many instances the alkaline media caused dehydrohalogenation reactions to occur. All of these disadvantages are highly undesirable from a commercial standpoint, and accordingly a need has arisen for improved processes for cyanation of unsaturated organic halides.

Is has been disclosed (U. S. 2,342,101) that 1,4-dicyano-2-butene can be prepared by reacting 1,4-dibromo-2-butene or 1,4-dichloro-2-butene with an alkali metal or alkaline earth metal cyanide in an alkaline alcoholic reaction medium. In the latter process the alkaline cyanide could be produced in situ from the alkali metal hydroxide and hydrogen cyanide, but when this was done an alkaline medium was always employed. Catalysts such as cuprous cyanide were effective in the said process. It has also been reported that certain unsaturated chlorides having an olefinic linkage between two aliphatic carbon atoms, at least one of which is tertiary, react with sodium cyanide to produce unsaturated nitriles (U. S. 2,097,155). In the latter process, which required several hours for completion, the medium was substantially anhydrous, and an organic solvent, such as acetone, was required in the separation of the organic salt from the reaction product. Neither of these previously known processes involved the use of an acidic reaction medium. Acidic reaction media have been employed in processes for reacting unsaturated alcohols such as allyl alcohol with cuprous cyanide. For example, it has been reported that if one treats allyl alcohol with cuprous cyanide and concentrated hydrochloric acid a mixture containing hydrogen cyanide, allyl chloride and vinyl acetonitrile can be obtained. In the said process (Breckpot, Bull. Soc. Chim. Belg. 39, 462 (1930); cf. also O. P. B. Report 636) no cyanides other than cuprous cyanide are disclosed as being operative.

An object of this invention is to provide an improved process for the preparation of unsaturated nitriles containing the structural unit

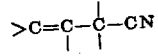

Another object of the invention is to provide a process for preparing the said nitriles from unsaturated halides and mixtures thereof without employing cuprous cyanide as a reactant, and without using alkaline media in which undesirable by-products are formed. A further object of the invention is to provide a process whereby dicyanobutenes can be prepared from hydrogen cyanide and dihalobutenes without converting the said hydrogen cyanide to the polymeric by-products which are normally formed therefrom in the presence of alkali. Other objects of the invention will appear hereinafter.

The aforesaid objects are accomplished in accordance with this invention by reacting an organic halide of the kind hereinafter disclosed with a cyanide of the class consisting of hydrogen cyanide, alkali metal cyanides and alkaline earth metal cyanides in an acidic aqueous medium, said acidic mixture of reactants containing, in specific embodiments, an acid which has been introduced from an external source. Any suitable acid may be employed, e. g. hydrochloric, sulfuric, phosphoric, oxalic, etc. In accordance with the present invention yields of nitriles as high as 96% of the theoretical or higher are obtainable in reaction times as short as 10 minutes (cf. Example 7, infra), or in reaction times even shorter than 10 minutes. The present invention is based in part upon the surprising discovery that hydrogen cyanide reacts very rapidly with a particular class of organic halides in an acidic aqueous medium to form the corresponding nitriles.

The organic halides which may be used as reactants in the practice of the invention all contain the grouping

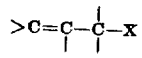

X being a halogen atom of the class consisting of chlorine and bromine. The carbon atom which is attached to the halogen atom in this structure is attached to other atoms by single bonds only. Likewise, in accord with this structure, the carbon atom in the gamma position is attached to other atoms by single bonds. In certain embodiments the double bond in the said structure may be a part of an alicyclic or heterocyclic ring, e. g. in benzyl chloride, 1,4-dichloro-2-cyclopentene, 2,5-dichloro-dihydrofurane, etc. While the process of the invention is operative with all compounds having the said structure, outstanding results are obtained when the halide is a chlorohydrocarbon having from 4 to 10 carbon atoms per molecule. In particular embodiments the organic halide reactant, preferably containing from 4 to 10 carbon atoms per molecule, may be a compound of the formula

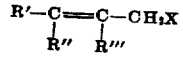

or a compound of the formula

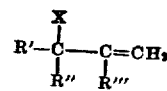

X being a halogen atom of the class consisting of bromine and chlorine, R' being a member of the class consisting of alkyl, alkenyl, chloroalkyl and cyanoalkyl groups, R'' and R''' being members of the class consisting of hydrogen and methyl groups. R, R', R'', and R''' may represent the same or different groups in accordance with the above definition.

The cyanide may be introduced into the acidic reaction mixture in the form of alkali metal or alkaline earth metal cyanide, the addition of the alkaline cyanide, and the acid content of the reaction mixture, being controlled so that during substantially all of the reaction period the reaction mixture is kept acidic. In another specific embodiment of the invention, a substantial excess of the hydrogen cyanide reactant is initially present (preferably at least 2 mols of HCN per halogen atom in the organic halide) and, as a result, the excess hydrogen cyanide reacts with the hydrogen halide produced by the cyanation reaction. Thus, the hydrogen cyanide serves not only as a reactant but also as an acceptor for the evolved hydrogen halide. It is also possible, but not at all necessary, to employ an alkaline or substantially neutral water-soluble acceptor which is capable of reacting with the hydrogen halide formed by the reaction between the hydrogen cyanide and the organic halide, the manner of addition of the said acceptor being preferably controlled so that the system remains acidic during substantially all of the reaction period. In general, the pH is kept within the range of 1 to 7 in the practice of the invention. The pH can be controlled satisfactorily as above described by feeding sodium cyanide, sodium hydroxide, or other water-soluble alkaline reactant or acceptor into the mixture at such a rate as to maintain the acidity within the said limits. At a pH above 7, formation of the less desirable products is excessive, and this interferes with the recovery of the desired product. Moreover, the cyanation of the organic halide is much more rapid in aqueous acid media than in alkaline media. The maximum reaction rate is realized at the lowest pH. An extremely rapid formation of nitrile is obtained at a pH below 3.0 (cf. Example 6, infra). With organic halide reactants which are sensitive to some extent to strong acids a pH of 4 to 7 is generally selected.

The process of this invention may be carried out at any suitable temperature or pressure, convenient reaction rates being obtained at temperatures within the range of about 50° to 180° C. Superatmospheric pressures may be employed if desired. When the reactant halide is a dichlorobutene, temperatures as low as about 50° to 80° result in the formation of substantial amounts of 1-chloro-4-cyano-2-butene. Less reactive halides, e. g. allyl halide, do not react at a rapid rate at temperatures below 50° C., and somewhat higher temperatures are usually employed with such halides as reactants.

Without detraction of any of the products of the invention, it should be emphasized that products of very considerable value are obtained in the pratice of this invention when the reactant halide is a halobutene, e. g. 1,4-dihalo-2-butene, 3,4-dihalo-1-butene or mixtures thereof. These dihalo-butenes are, in fact, uniquely well adapted for use in the practice of the present invention. It is indeed surprising that regardless of whether the dihalobutene employed is a 1,4-dihalo-2-butene or a 3,4-dihalo-1-butene, the final reaction product is the same dicyanobutene, namely 1,4-dicyano-2-butene. This, of course, is an important observation because the dinitriles in which the CN groups are at the ends of the chain are highly valuable industrially, e. g. in the manufacture of nylon-type resins. Another surprising observation which is highly valuable is the discovery that, in general, organic halides which do not have the structure of the reactants herein described do not yield nitriles under the reaction conditions employed in the practice of this invention. It has been discovered, for example, that neither 2,3-dichloro-1,3-butadiene nor tertiary butyl chloride is converted to nitrile under the conditions herein disclosed. This is a significant observation because it makes possible the manufacture of nitriles from mixtures of halogenated butenes which contain not only dihalobutenes having the structure which is requisite in the practice of the invention, but also saturated halogenation products and other halogenation products of butene which would yield nitriles having boiling points similar to the desired nitriles in which the CN groups are at the ends of the chain. As a result the manufacture of the said desirable nitriles is greatly facilitated. Still another unpredictable and valuable discovery which is involved in the present invention is the observation that the cyanation process of this invention is broadly operative providing the halide reactant has the grouping

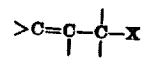

as above defined. The present invention gives remarkably improved results with the methallyl halide type of reactant, and it is even more surprising that highly satisfactory results are obtained even when neither of the carbon atoms joined by the double bond is a tertiary carbon atom. In fact, the present invention makes possible the formation of certain halonitriles which could not be produced satisfactorily in a nonacidic medium of the kind heretofore employed in cynation processes.

Catalyst such as copper salts, cobalt salts, metallic copper, potassium ferricyanide, etc. may be employed advantageously in the practice of the invention, but the presence of these catalysts is not absolutely essential. In general, dissolved copper-containing catalysts, such as the copper halides, are highly effective, and only relatively small amounts are sufficient, e. g. about 0.1% (or less) to 10% based upon the total weight of the reaction mixture. Cupric and cuprous salts are equally effective.

The invention is illustrated further by means of the following examples. It will be understood that the yields reported in these examples do not in all instances represent the maximum yields obtainable.

*Example 1.*—A mixture consisting of 31 grams 1,4-dichloro-2-butene, 65 milliliters of liquid hydrogen cyanide, and 50 milliliters of water was heated for 2 hours in a closed reaction vessel at a temperature of 99° to 114° C. During the entire reaction period the reaction mixture remained acidic. The resulting mixture was extracted with chloroform, and the chloroform was evaporated on the steam bath until upon cooling the mixture crystalline 1,4-dicyano-2-butene was formed. The weight of dried crystals corresponded to a 45% conversion of 1,4-dichloro-2-butene to 1,4-dicyano-2-butene.

*Example 2.*—A mixture consisting of 1 gram cuprous chloride, 1 gram copper powder, 1 gram ammonium chloride, 10 milliliters water and 1 milliliter of concentrated hydrochloric acid was charged into a reaction vessel under an atmosphere of nitrogen equipped with a reflux condenser, and this mixture was heated to a temperature of 100° C. A mixture containing 31 grams 1,4-dichloro-2-butene and 40 milliliters of liquid hydrogen cyanide was added dropwise simultaneously with a solution of 26 grams of sodium cyanide in 100 milliliters of water while the hot reaction mixture was being stirred rapidly. The resulting product was cooled and filtered, yielding 22 grams of 1,4-dicyano-2-butene which prior to recrystallization had a melting point of 74° to 76° C.

*Example 3.*—A mixture consisting of 31 grams of 1,4-dichloro-2-butene, 65 milliliters of hydrogen cyanide, 1 milliliter of concentrated hydrochloric acid, 100 milliliters of water, 18 grams of cuprous chloride, 6 grams of ammonium chloride, and 3 grams of copper powder was heated in a closed vessel under autogenous pressure at 96° to 120° C. for 5.5 hours. Upon extraction of the resulting mixture with chloroform and evaporation of chloroform from the extract, a residue (weight, 18 grams) of flaky crystals of 1,4-dicyano-2-butene was obtained. Recrystallization from methanol gave 12.0 grams of 1,4-dicyano-2-butene, M. P. 73° to 76° C. The mother liquor contained oily material (chlorocyanobutene, etc.).

The experiment was repeated, except that the reaction temperature was maintained at 140° C. during most of the reaction period. The weight of 1,4-dicyano-2-butene obtained was 19.8 grams.

*Example 4.*—A mixture containing 70 grams 3-chloro-1-butene, 40 milliliters of liquid hydrogen cyanide, 1 gram of $CuCl_2.2H_2O$, and 100 milliliters of water is heated at 65° to 70° C. for 30 minutes. The pH of the reaction mixture is maintained at 4.0 to 6.5 by controlled addition of dilute sodium hydroxide. Distillation of the reaction product gives about 39 grams of nitrile (largely crotyl cyanide) most of which boils at 142° to 143° C. at atmospheric pressure.

*Example 5.*—A mixture consisting of 1 gram cuprous chloride, 1 gram powdered copper, 1 gram ammonium chloride, 5 milliliters of concentrated hydrochloric acid, 62 grams of 1,4-dichloro-2-butene, 12 milliliters of hydrogen cyanide and 60 milliliters of water was heated on the steam bath in an apparatus which was flushed with nitrogen, and which was equipped with a pH meter, reflux condenser and stirrer. Stirring was started, and an aqueous solution of sodium cyanide (52 grams of sodium cyanide in 125 milliliters of water) was added from a dropping funnel at such a rate as to keep the pH at 4 to 7. The resulting product, upon evaporation of excess hydrogen cyanide and cooling, gave 65 grams of product. Upon recrystallization from methanol 41 grams of 1,4-dicyano-2-butene was obtained, and 5 grams of semi-solid oily product.

*Example 6.*—A mixture consisting of 940 grams 3,4-dichloro-1-butene, 12 grams $CuCl_2.2H_2O$, 30 milliliters of concentrated hydrochloric acid and 400 milliliters of water was heated to a temperature of 85° C. in a reaction vessel which was equipped with a stirrer and reflux condenser. A 40% solution (by weight) of sodium cyanide in water was added slowly to the stirred reaction mixture, and cyanation proceeded so rapidly that the removal of reaction heat was limited by the heat withdrawing capacity of the laboratory-type reflux condenser. After a total reaction time of 15 minutes, during which a total of 425 cubic centimeters of the sodium cyanide solution (which was only 25% of the amount theoretically required) had been introduced (reaction temperature 85° to 95° C.; pH 2.5 to 3.0), the reaction mixture was cooled by discharging into a vessel containing ice. The mixture was then extracted with chloroform and the chloroform extract was distilled, yielding 673 grams of a mixture of 1,4-dicholoro-2-butene and 3,4-dichloro-1-butene. The residue comprised chlorocyanobutene, 6.7% conversion, boiling mostly at 67° to 75° C. at 3 millimeters (Saponification Number 476.86, 476.63, calc. for $ClCH_2CH=CHCH_2CN$ 485; % N, 12.07, calc. for $ClCH_2CH=CHCH_2CN$, 12.1) and 1,4-dicyano-2-butene, 16.8% conversion (95% total yield of chloronitrile plus dinitrile, based on the dichlorobutene consumed).

*Example 7.*—A mixture consisting of 62 grams of 1,4-dichloro-2-butene, 10 grams copper powder, 50 milliliters of water and 2 milliliters of concentrated hydrochloric acid was heated to a temperature of 95° C., and a solution of 52 grams of sodium cyanide in 75 milliliters of water was added sufficiently slowly to maintain the pH within the range 3.0 to 6.5. This required a reaction time of 10 minutes; maximum temperature reached during this period was 106° C. The product was cooled, and extracted with chloroform. Distillation of the chloroform extract gave 1,4-dicyano-2-butene in 96% yield based on the dichlorobutene consumed, the conversion based on dichlorobutene initially charged being 87% of the theoretical.

*Example 8.*—A mixture consisting of 60.5 grams of allyl bromide, 50 milliliters of water, 2 milliliters of concentrated hydrochloric acid and 1 gram $CuCl_2 \cdot 2H_2O$ was heated to a temperature of 70° C. with stirring. To this mixture was added a solution of 26 grams NaCN in 60 milliliters of water at a rate such that a pH of 5 to 6 was maintained. The product was extracted with ether, and the ether extract was dried with $K_2CO_3$ and distilled, yielding 23.8 grams of allyl cyanide (B. P. mostly at 116° to 116.5° C.).

*Example 9* (A).—(Illustrating the very low conversion obtained in the prior art process for reacting isobutenyl chloride with sodium cyanide.)

About 53.9 grams (1.1 mols) of sodium cyanide were added to about 90.5 grams (1.0 mol) of isobutenyl chloride and the mixture was charged into a stainless steel autoclave equipped with heating means and means for agitating the contents. The mixture was agitated and heated at a temperature of 120° C. for 3 hours. The cooled mixture contained 76 grams of unreacted isobutenyl chloride. Analysis of the remainder of the reaction product showed that it contained only 1.05% nitrogen, and that the conversion to nitrile must have been extremely low. A similar result was obtained when this experiment was repeated using acetone as an extractant medium to separate the cooled products from sodium cyanide and sodium chloride.

B. (Illustrating, by comparison with the result described in the preceding paragraph, the high conversion and yield obtainable by the use of an aqueous acid medium.)

To a stirred mixture of 46 grams isobutenyl chloride (0.5 mol), 1 gram $CuCl_2 \cdot 2H_2O$, 2 milliliters concentrated hydrochloric acid and 50 milliliters of water at a temperature of about 70° was added a solution of 25 grams of sodium cyanide in 50 milliliters of water dropwise at such a rate that the pH of the reaction mixture was 4.5 to 5.5. The bulk of the cyanide was added during about 20 minutes, an additional 20 minutes being required for addition of the remaining 10–15%. The mixture was cooled, and the clear colorless oil layer was separated. The aqueous layer was extracted with ether, the extract being added to the oily product. The mixture was dried with $K_2CO_3$ and distilled, yielding 33 grams of isobutenyl cyanide, boiling at 136° C. (81% conversion and yield).

*Example 10*.—To a mixture of 50 milliliters of water, 2 cc. concentrated HCl, 1 gram cupric chloride.$2H_2O$ and 47 grams cinnamyl chloride (0.3 mol) heated to about 80° C. was added a solution of 16 grams sodium cyanide in 25 milliliters water at such a rate that the pH of the reaction medium did not rise above 6. Addition time was 25 minutes. Upon cooling some tarry material separated. The oil layer was taken up in ether and dried with magnesium sulfate. Fractional distillation gave 9 grams recovered cinnamyl chloride and 27 grams cinnamyl cyanide (boiling point 110 to 115° C. at 2 mm. mercury; melting point 51° to 56° C.). This represents a 61% conversion and 77% yield. The nitrile crystallized readily from methanol (melting point of recrystallized product, 58° to 59° C.). % N calc., 9.93; found, 9.53, 9.57.

*Example 11*.—A solution of calcium cyanide in water was prepared as follows:

To 23 grams of calcium hydroxide (0.25 mols) slurried in 200 milliliters of water was added a solution of 23 milliliters of HCN (0.5 mol) in 200 milliliters of cold water. There resulted 440 milliliters of a cloudy light yellow solution.

Distilled water (100 milliliters) and 1.5 grams of $CuCl_2 \cdot H_2O$ and 30.25 grams of 1,4-dichloro-2-butene was charged to a reaction flask fitted with a reflux condenser, stirrer, dropping funnel, thermometer, and electrodes for measuring pH. The mixture was heated to 85° C. and 375 milliliters (85% of theory) of the calcium cyanide solution prepared as described above was added over a period of 25 minutes during which the pH was maintained at between 2.0 and 6.0 and a temperature of 95 to 97° C. obtained. The reaction mixture was cooled to 5° C. and filtered and the crystalline 1,4 - dicyano-2-butene was washed with 100 milliliters of ice water. The air dried product weighed 18.3 grams representing a 69.2% conversion based upon the dichlorobutene or 81.3% conversion based upon calcium cyanide charged. In view of the relatively high solubility of the dinitrile in water the actual conversions were undoubtedly considerably higher than these figures represent.

*Example 12*.—A mixture of 100 grams water, 5 milliliters concentrated HCl and 66 grams of 2-chloro-methylthiophene (made by chloromethylation of thiophene) was stirred and a solution of 31 grams NaCN (0.6 mol) in 75 milliliters water was added dropwise keeping the pH less than 7. The reaction was very rapid and the temperature rose abruptly to about 75°. About 5 minutes was required for addition of about 90% of the cyanide when the reaction ceased abruptly. The oil layer was rectified yielding 16.2 grams of 2- cyanomethyl thiophene, B. P. 82° to 85° at 1 millimeter. This represents a 26.5% conversion. Higher boiling products were also formed.

It is to be understood that the present invention is not limited to the specific embodiments illustrated in the foregoing examples, since many other ways of practicing the invention will occur to those who are skilled in the art. The process may be conducted either batchwise or continuously. Any method for obtaining the desired agitation of the reactants may be employed, such as the use of turbulent flow conditions in continuous systems. In the continuous process the alkaline reagent may be introduced at more than one point along the reaction vessel to obtain a suitable pH throughout the reaction mixture. Any of the common methods for avoiding excessive air oxidation of the components of the reaction mixture may be adopted, such as the charging of the reactants under a blanket of inert gas. When the organic halide reactant contains more than one halogen atom per molecule, the partially cyanated product may be recycled if a more completely cyanated product is desired, e. g. chlorocyanobutene can be recycled in the synthesis of dicyanobutene in accordance with the invention.

While no organic diluent is generally needed in the practice of the invention, such inert diluents may be added if desired. In some instances an organic solvent which is not miscible with water may be added, without disadvantage. When the organic reactant is soluble in water, homogeneous reaction mixtures are sometimes preferred. The use of emulsifying agents in certain instances is effective when the organic reagent is insoluble in water, but such agents are generally not needed. The invention contemplates carrying out the cyanation either in the dark or in the presence of ordinary or actinic forms of light.

In the embodiment in which a copper-containing catalyst is employed, any convenient method may be used for recovery of the catalyst. It is sometimes possible, for example, to precipitate the catalyst by decreasing the pH, after the cyanation is complete.

The amount of water present during substantially all of the reaction period should be sufficient to permit adequate contact between the organic reactant and the cyanide reactant. Rather large amounts of water may be used, if desired, to absorbe the HCl, or to assist in the dissemination of the alkaline acceptor, when one is used. Even in extremely dilute aqueous solutions the desired cyanation reaction takes place very readily. Preferably, the water content of the reaction mixture is about 0.2 to 10.0 times the weight of —CN present. Accordingly, the amount of water should exceed the amount commonly present in ordinary liquid hydrogen cyanide, when hydrogen cyanide is used as the inorganic cyanide reactant. When sodium cyanide is used as the source of —CN, the amount of water should be sufficient to dissolve all or a substantial part of the sodium cyanide.

Since, in general, the rate of cyanation in acidic media in accordance with the present invention is inherently extremely rapid, means should be provided for absorbing at least a part of the reaction heat. This is especially important if the reaction mixture has a relatively low pH. In laboratory-scale operation a reflux condenser is a suitable heat-withdrawing device and the degree of flooding of this condenser sometimes depends upon the pH of the reaction mixture. Thus, when the reflux condenser floods excessively, the reaction rate should be lowered by increasing the pH, until the flooding ceases. Because of the rapid reaction rate it is apparent that the organic halide reactant may contain substituent groups which otherwise might interfere with the cyanation reaction, since competitive reactions due to the presence of such substituents would not, as a rule, be sufficiently rapid to completely suppress the said cyanation reaction.

An acceptor is not needed in the practice of the present invention, but is useful in specific embodiments in avoiding excessive loss of hydrogen cyanide by reaction with the evolved hydrogen halide. Suitable alkaline acceptors included alkali metal and alkaline earth metal oxides, hydroxides, amines, ammonia, etc. Non-alkaline acceptors include ethylene oxide, tertiary butanol, etc.

Excess hydrogen cyanide is itself an acceptor for the hydrogen halide provided a more reactive acceptor is not present, but it is not an acceptor in the presence of alkaline reagents which prevent the formation of chloromethyl-formamidine hydrochloride, or other reaction products, by reaction between hydrogen cyanide and hydrogen chloride.

From the results disclosed in the foregoing examples it is apparent that hydrogen cyanide reacts very rapidly in an aqueous acid medium with the organic halide reactant. When an alkali metal or alkaline earth metal cyanide is used in the practice of this invention as a source of —CN, the alkali or alkaline earth cyanide may also act directly upon the organic halide, but even under these circumstances, conditions are such that the hydrogen cyanide which is formed in the acidic reaction medium also reacts directly with the organic halide. In the latter embodiment the alkali metal or alkaline earth metal cyanide serves not only as a source of —CN but also as an alkaline acceptor for the hydrogen halide produced by the cyanation reaction.

It is to be understood that in the expressions

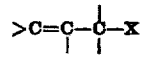

and

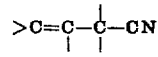

the bonds which represent unoccupied valences are single bonds, i. e. the existence of two such bonds on the same carbon atom does not constitute a double bond. The organic halide reactants thus do not include such substances as acryloyl chloride or ketenes of beta-chloro acids. Substances of the following types, however, are included: benzyl chloride, benzal chloride, benzotrichloride, triphenylmethyl chloride, 2,5 dichloro-2,5-dihydrofurane, phenallyl chloride, alpha-vinyl allyl chloride, alpha-chloro-beta- chloro-gamma, gamma-dichloro-allyl chloride, etc.

Since many different embodiments of the invention may be made without departing from the spirit and scope thereof, it is to be understood that we do not limit ourselves except as set forth in the following claims.

We claim:
1. A process for the preparation of organic nitriles which comprises introducing into a reaction vessel an organic halide of the formula RX wherein R represents an organic radical of the class consisting of allyl, isobutenyl, cinnamyl, monohaloalkyl-CH=CHCH₂-, monocyanoalkyl-CH=CHCH₂—

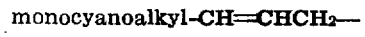

and

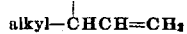

groups, X being a member of the class consisting of chlorine and bromine, said organic halide reactant having not more than 10 carbon atoms per molecule, and a cyanide of the class consisting of hydrogen cyanide, alkali metal cyanides and alkaline earth metal cyanides, maintaining these reactants at reaction temperature in an aqueous acid liquid medium whereby an organic nitrile having a double bond between carbon atoms, one of which is singly bonded to a carbon atom attached directly to a cyano group is produced, said cyanide reactant acting also as an acceptor for hydrogen halide, and thereafter separating the said organic nitrile from the resulting mixture.

2. A process for the preparation of organic nitriles which comprises reacting an organic halide of the formula RX wherein R represents an organic radical of the class consisting of allyl, isobutenyl, cinnamyl, monohaloalkyl-CH=CHCH₂-, monocyanoalkyl-CH=CHCH₂-,

and

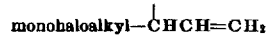

groups, X being a member of the class consisting of chlorine and bromine, said organic halide reactant having not more than 10 carbon atoms per molecule, with hydrogen cyanide in an aqueous acidic liquid medium at a temperature within the range of about 50° to 180° C., in the presence of a readily water-soluble acceptor for hydrogen halide, continuing the resulting reaction until a nitrile having a double bond between carbon atoms, one of which is singly bonded to a carbon atom attached directly to a cyano group is obtained, and thereafter separating the said nitrile from the resulting reaction mixture.

3. A process according to claim 2 in which the quantity of hydrogen cyanide initially present is stoichiometrically in excess of the quantity of halogen in the organic halide initially present, said excess hydrogen cyanide acting as the water-soluble hydrogen halide acceptor.

4. A process for preparing nitriles which comprises reacting an organic halide of the formula RX wherein R represents an organic radical of the class consisting of allyl, isobutenyl, cinnamyl, monohaloalkyl-CH=CHCH₂-, monocyanoalkyl-CH=CH₂-,

and

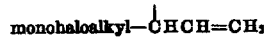

groups, X being a member of the class consisting of chlorine and bromine, said organic halide reactant having not more than 10 carbon atoms per molecule, with hydrogen cyanide in an aqueous acidic medium in the presence of a readily water-soluble hydrogen halide acceptor, the amount of water present throughout the reaction period being at least 20% of the weight of —CN in the hydrogen cyanide which has been introduced.

5. A process for the synthesis of 1,4-dicyano-2-butene which comprises heating 3,4-dichloro-1-butene with more than two mols of hydrogen cyanide per mol of the said 3,4-dichloro-1-butene, in an aqueous acid medium at a temperature of 50° to 180° C. in the absence of a hydrogen halide acceptor other than hydrogen cyanide, and thereafter separating 1,4-dicyano-2-butene from the resulting mixture.

6. A process for the synthesis of 1,4-dicyano-2-butene which comprises heating 1,4-dichloro-2-butene with more than two mols of hydrogen cyanide per mol of the said 1,4-dichloro-2-butene, in an aqueous acid medium at a temperature of 50° to 180° C. in the absence of a hydrogen halide acceptor other than hydrogen cyanide, and thereafter separating 1,4-dicyano-2-butene from the resulting mixture.

7. A process for the synthesis of 1,4-dicyano-2-butene which comprises reacting 3,4-dichloro-1-butene with hydrogen cyanide in an aqueous acid medium containing a dissolved copper-containing catalyst while introducing, as the reaction progresses, a readily water-soluble alkaline acceptor for the hydrogen halide formed by the said reaction, and thereafter separating 1,4-dicyano-2-butene from the resulting reaction mixture.

8. A process for the synthesis of 1,4-dicyano-2-butene which comprises reacting 1,4-dichloro-2-butene with hydrogen cyanide in an aqueous acid medium, while adding gradually as the reaction progresses, an alkaline acceptor for the hydrogen halide formed by the said reaction, and thereafter separating 1,4-dicyano-2-butene from the resulting reaction mixture.

9. A process for the synthesis of 1,4-dicyano-2-butene which comprises heating 3,4-dichloro-1-butene with hydrogen cyanide at a temperature of 50° to 180° C. in an aqueous acid medium containing a copper halide catalyst, while adding sodium cyanide gradually as the reaction progresses, the rate of introduction of the said inorganic cyanide being controlled so as to maintain the pH of the reaction mixture below 7, and thereafter separating 1,4-dicyano-2-butene from the resulting mixture.

10. A process for the synthesis of 1,4-dicyano-2-butene which comprises heating 1,4-dichloro-2-butene with hydrogen cyanide at a temperature of 50° to 180° C. in an aqueous acid medium containing a copper halide catalyst while adding sodium cyanide gradually as the reaction progresses, the rate of introduction of the said inorganic cyanide being controlled so as to maintain the pH of the reaction mixture below 7, and thereafter separating 1,4-dicyano-2-butene from the resulting mixture.

11. A process for the synthesis of 1,4-dicyano-2-butene which comprises reacting 1,4-dichloro-2-butene with hydrogen cyanide in an aqueous medium at a pH below 3 in the presence of a water-soluble acceptor for the hydrogen chloride produced by the said reaction, and separating 1,4-dicyano-2-butene from the resulting reaction mixture.

12. A process for the synthesis of 1,4-dicyano-2-butene which comprises reacting 3,4-dichloro-1-butene with hydrogen cyanide in an aqueous medium at a pH below 3 in the presence of a water-soluble acceptor for the hydrogen chloride produced by the said reaction, and separating 1,4-dicyano-2-butene from the resulting reaction mixture.

13. A process for the preparation of organic nitriles having a double bond between carbon atoms, one of which is singly bonded to a carbon atom attached directly to a cyano group, which comprises introducing into a reaction vessel an organic halide of the formula RX, wherein R represents an organic radical of the class consisting of allyl, isobutenyl, cinnamyl, monohaloalkyl-CH=CHCH₂-, monocyanoalkyl-CH=CHCH₂-

and

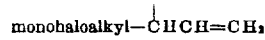

groups, X being a member of the class consisting of chlorine and bromine, said organic halide having not more than 10 carbon atoms per molecule, and a cyanide of the class consisting of hydrogen cyanide, alkali metal cyanides, and alkaline earth metal cyanides, heating the said cyanide and organic halide in an aqueous medium at a temperature within the range of about 50° to 180° C., while maintaining the pH on the acid side, said cyanide acting as an acceptor for hydrogen halide, continuing the resulting reaction in the liquid phase under acidic aqueous conditions until a nitrile having a double bond between carbon atoms, one of which is singly bonded to a carbon atom attached directly to a cyano group, is obtained, and thereafter separating the said nitrile from the resulting reaction mixture.

14. A process according to claim 13 in which the cyanide which is introduced into the reaction vessel is sodium cyanide, and the rate of addition of the said sodium cyanide to the reaction mixture containing the organic halide is controlled so that during substantially all of the reaction period the reaction mixture is acidic.

15. A process according to claim 13 in which the said reaction is conducted in the presence of a dissolved copper-containing catalyst.

16. A process according to claim 13 in which the said organic halide is a dichlorobutene.

17. A process according to claim 13 in which the said organic halide is 1,4-dichloro-2-butene.

18. A process according to claim 13 in which the said organic halide is 3,4-dichloro-1-butene.

19. A process according to claim 13 in which the said organic halide is a mixture of 1,4-dichloro-2-butene and 3,4-dichloro-2-butene.

IRVING D. WEBB.
GEORGES E. TABET.

REFERENCES CITED

The following references are of record in the file of this patent:

UNITED STATES PATENTS

| Number | Name | Date |
|---|---|---|
| 1,672,253 | Giles | June 5, 1928 |
| 1,859,140 | Hass et al. | May 17, 1932 |
| 2,097,155 | Groll et al. | Oct. 26, 1937 |
| 2,211,440 | Macallum | Aug. 13, 1940 |
| 2,242,084 | Nicodemus et al. | May 13, 1941 |
| 2,276,156 | Carter et al. | Mar. 10, 1942 |
| 2,342,101 | Cass et al. | Feb. 22, 1944 |
| 2,385,549 | Spence | Sept. 25, 1945 |
| 2,415,261 | Rogers | Feb. 4, 1947 |

FOREIGN PATENTS

| Number | Country | Date |
|---|---|---|
| 708,111 | France | July 20, 1931 |

OTHER REFERENCES

Breckpot, Bull. Soc. Chim, Belg., vol. 39, pp. 462–469 (1930).

Hinkel et al., J. Chem. Soc. (London), vol. 1944, pp. 647–648.